United States Patent [19]

Jürgen

[11] 4,420,748
[45] Dec. 13, 1983

[54] PASSIVE DATA DISPLAY AND METHOD AND MEANS FOR CONTROL AND MONITORING THEREOF

[75] Inventor: Appenrodt Jürgen, Villingen-Schwenningen, Fed. Rep. of Germany

[73] Assignee: Kienzle Apparate GmbH, Villingen, Fed. Rep. of Germany

[21] Appl. No.: 217,036

[22] Filed: Dec. 16, 1980

[30] Foreign Application Priority Data

Dec. 21, 1979 [DE] Fed. Rep. of Germany ....... 2951584

[51] Int. Cl.³ .............................................. G09G 3/18
[52] U.S. Cl. ................................... 340/715; 340/641; 340/765; 350/336
[58] Field of Search ................. 340/765, 715; 350/336

[56] References Cited

U.S. PATENT DOCUMENTS

| | | | |
|---|---|---|---|
| 3,716,290 | 2/1973 | Borel et al. | 340/765 X |
| 3,938,140 | 2/1976 | Garcia et al. | 340/765 |
| 4,127,321 | 11/1978 | Koyama et al. | 350/336 |
| 4,204,205 | 5/1980 | Yagi et al. | 340/765 X |
| 4,247,852 | 1/1981 | Utzinger | 340/765 X |
| 4,297,004 | 10/1981 | Nishimura et al. | 350/336 |

FOREIGN PATENT DOCUMENTS

| | | |
|---|---|---|
| 6996 | 1/1980 | European Pat. Off. . |
| 2421991 | 11/1974 | Fed. Rep. of Germany . |
| 2332970 | 1/1975 | Fed. Rep. of Germany . |
| 2532421 | 2/1976 | Fed. Rep. of Germany . |
| 2449740 | 4/1976 | Fed. Rep. of Germany . |
| 2502794 | 7/1976 | Fed. Rep. of Germany . |
| 2750659 | 6/1978 | Fed. Rep. of Germany . |
| 1428326 | 3/1976 | United Kingdom . |

OTHER PUBLICATIONS

Astle; "A Fail-Safe Font of Seven-Segment Digits"; Electronics, 8/28/72, pp. 93, 94.

*Primary Examiner*—David L. Trafton
*Attorney, Agent, or Firm*—Toren, McGeady and Stanger

[57] ABSTRACT

In the disclosed display, the symbol segments of a passive cell, such as a liquid crystal cell, are each connected to one of two leads through an elastic connector layer having mutually insulated conductors running through the layer transverse thereto. According to an embodiment of the invention, the leads are on a printed circuit board and a control bus connects one of the leads to a control unit that operates the cell and a second bus connects the other of each of the leads to a monitor unit that compares the potential at each segment with the potential at the control unit. This checks the connections between the control unit and each segment.

12 Claims, 2 Drawing Figures

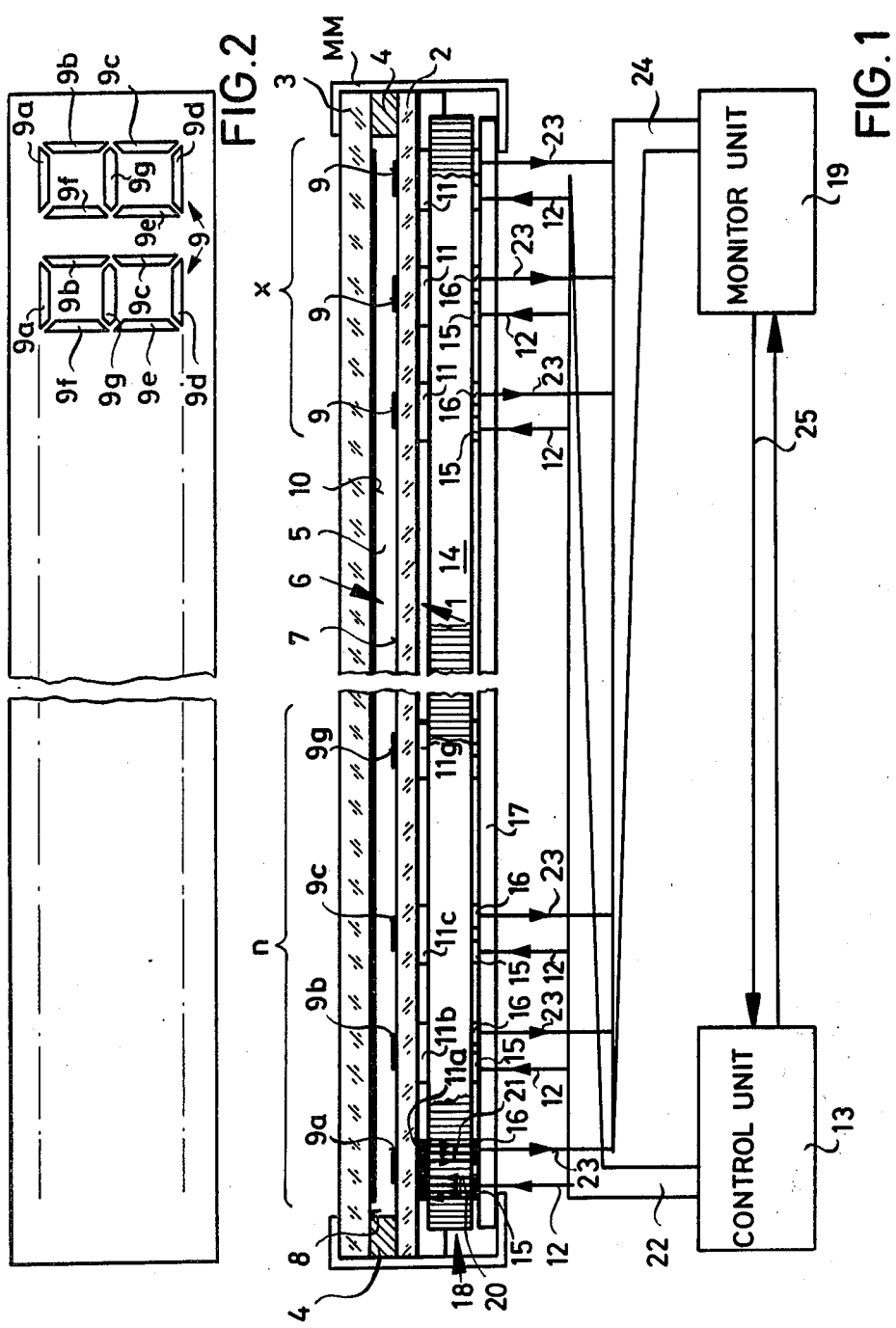

PASSIVE DATA DISPLAY AND METHOD AND MEANS FOR CONTROL AND MONITORING THEREOF

BACKGROUND OF THE INVENTION

This invention relates to passive data displays, and particularly to methods and means for controlling and monitoring the operation of a passive electro-optical data display, such as a liquid crystal display, that shows numbers or symbols in response to selective activation of separately controllable line segments.

Various types of electro-optical data displays have been available commercially for a number of years and are used widely for display of optical information such as alpha-numeric data and the like. One widely used type of data display is a liquid crystal display which, in a typical case, utilizes seven segments which are selectively energized to display each digit. As is well known, a liquid crystal cell is composed of two glass plates covered with transparent conductive layers on the surface facing one another. The plates sandwich a nematic liquid crystal. A voltage applied to the thin film electrodes formed by the transparent conductive layers produces an electric field which results in zones of different refraction coefficients. Depending upon the structure of the transparent electrodes, the liquid crystal cell can be used for the display of numbers, letters, or other data. Depending on how it is utilized, the liquid crystal display can be constructed to operate in a reflection or transmission mode on the basis of whether the impinging or transient light is to be dispersed.

Passive displays such as liquid crystal cells basically differ from active displays in that they do not produce their own light but only modulate external light. Among various advantages, liquid crystal cells have the special benefit that their current consumption is very low. However, this very low current drain does introduce a disadvantage in that a test of the operation of the electrodes forming the line of the characters becomes virtually impossible.

In active displays, such as LED displays, a check of the display data is simple. As the individual segment currents are measured, they are retroactively compared with the data input. If necessary, an error signal is derived therefrom. A segment check of this type does not lead to useful results with passive displays, such as liquid crystal displays. This is due in part to the very low and relatively strongly scattered segment currents. To increase the reliability of the symbol display, the possibility of redundant operation has been considered. This is disclosed in German Offenlegungschrift No. 24 02 749. Alternatively, attempts have been made to maintain the display by further segmentation of the individual symbols. See German Offenlegungschrift No. 24 59 488. However, these measures result in significant production costs and expensive circuitry.

To overcome such unsatisfactory conditions in liquid crystal displays, proposals have been made in German Offenlegungschrift No. 27 43 907 that the front plate carry additional electrodes (check electrodes) which are electrically connected to one of the segment forming electrodes ("endangered segment electrodes"). Upon failure or occurrence of improper control signals, an alarm signal is to be displayed. The back plate is to contain a "check back electrode" which is located only opposite the check electrodes. However, this means providing an additional check electrode for each of the so-called endangered segment electrodes, i.e., at least five segment electrodes in a seven segment number display. Also, the back plate of the display must contain an additional "check back electrode" which interacts only with the check electrodes. Thus, aside from the seven segment electrodes and the conventionally used back electrodes, the arrangement must include five check electrodes and a check back electrode for the purpose of the proposed test cycle. The entire arrangement must fit on a carrier plate. This is quite complicated. The very large number of separate electrical connections results in a corresponding substantial source of contact errors. Check electrodes represent expensive, special equipment. Hence, displays of the conventional kind do not carry display check arrangements.

Generally, in analyzing the principal possible sources of errors and their effects on a display system of the aforementioned type, it is possible to localize the actual sources of error to particular places. These can be found specifically in the area of the display element or, electrically ahead of this element in the area of the display control. A few sources of error can be partially attributed to production defects, or to aging effects to which each component is subjected. These produce visible effects on the symbol display. For example, aging, an unsealed cell, operation above permitted temperature ranges, broken glass, destruction of polarizers, and the like directly affect all the segments or the entire display component. Such phenomena at the display itself always affect all the display elements. Hence, an error is easily visible.

Errors which are not visible, on the other hand, create incorrect displays which cannot be recognized visibly by an observer. Such an inaccurate display is usually caused by a defect in the control when individual segments fail or are incorrectly activated during the display operation. Such errors may arise, for example, from a defective integrated circuit in the control unit, defective printed conductors, faulty contacts at the display component, and especially failure of individual control lines, etc. The aforementioned sources of error are particularly likely to cause optically imperceptible display errors. Hence, it is essential that officially licensed or otherwise authorized devices which can be calibrated, such as, for example, taxi meters, money counters, scales and meters, and the like be monitored by test devices so their inaccuracies can be disclosed.

An object of the invention is to improve data displays.

Another object of the invention is to avoid the aforementioned disadvantages.

Still another object of the invention is to provide a simple method and means for controlling, monitoring, and checking the operation of an essentially passive data display, particularly a liquid crystal data display in order to make optically invisible display errors perceptible.

SUMMARY OF THE INVENTION

According to a feature of the invention, these objects are attained in whole or in part, by splitting the connection to each segment of a display with an electrically anisotropic resistor layer to at least two separate printed conductors on a printed circuit board.

According to another feature of the invention, the first printed circuit conductor serves as a control line for symbol information to the segment in the display. The second printed conductor is connected to the same segment and serves as a check control line for monitoring the entire control panel including the contacts therein.

According to yet another feature of the invention, the printed circuit board contacts the segments or segment electrodes through segment contacts from the segments outside a liquid crystal cell in a liquid crystal display. The printing on the board is divided into two electrically separate conductor lines. An intermediate connector of laminated rubber forms an electrical connection between the segment contacts and the conductor lines on the printed circuit board.

These and other features of the invention are pointed out in the claims. Other objects and advantages of the invention will become evident from the following detailed description when read in light of the accompanying drawing.

BRIEF DESCRIPTION OF THE DRAWING

In the drawing,

FIG. 1 is a partially schematic, partially cross-sectional representation of a multi-digit number display for indicating a group of numbers with a liquid crystal cell and including circuit means for controlling, monitoring and checking the operation of the display.

FIG. 2 is a plan view of the arrangement in FIG. 1.

DESCRIPTION OF PREFERRED EMBODIMENTS

In FIGS. 1 and 2, a liquid crystal display is composed of a front glass plate 2 and a back glass plate 3 which are spaced from each other in exact parallel relation by a spacing frame 4. The glass plates 2 and 3 and the spacing frame 4 form a cell 5 which is filled with a liquid crystal substance such as a nematic liquid crystal that forms an appropriately thin liquid crystal layer.

The inner surfaces 7 and 8 of the glass plates 2 and 3 face each other and are covered with separately controllable conductive layers at least one of which is transparent. The layer on the inner surface 7 of the front glass plate 2 forms segment electrodes 9 and the conductive layer on the inner surface 8 of the back glass plate 3 forms a back electrode 10. In a numerical liquid crystal display, seven segment electrodes 9 are arranged to form a figure 8. The individual segments 9 of a number in a numerical display are designated with supplemental letters a through g starting at the upper crossbar of the 8 and continuing clockwise so as to form a "0" and finally ending in the crossbar that forms the 8 which utilizes the entire supply of segment electrodes for any one digit. The center crossbar carries the suffix designation g. Each segment electrode 9a to 9g in any digit is provided with its own lead which, similar to a conductor path, passes outwardly, for example, onto the front glass plate 2. There, it forms a metallized contact surface that serves as a segment contact 11.

The segment contacts 11 are spaced and insulated from each other. They are constructed for laminar connection or surface contact and are also designated a to g so as to correspond with the segment electrodes 9a to 9g to which they are connected within the liquid crystal display. Suitable connectors connect the segment contacts 11 to control lines 12 for feeding information from an electronic control unit 13.

Continuously testing the momentary condition of a segment electrode 9a through 9g involves monitoring the control signals flowing into the display 1 from the control unit 13 for formation of data, retroactively transferring the control signals into a monitoring unit 19, and thereafter, performing a comparison of the control signal with the monitoring signal. This further involves providing a simultaneous, but electrically separately connected, forward and return flow of information signals to and from the symbol-forming segment electrodes 9a to 9g.

A means for ensuring simultaneous forward and return flow of data signals to and from the segment electrodes 9 through a single connection is provided by splitting the connection of each segment electrode 9 to at least two separate conductor tracks or paths 15 and 16 on a printed circuit board 17 through an electrically anisotropic resistor layer 14. The connection of a segment electrode 9, i.e., any one of segment electrodes 9a to 9g, through the first conductor path 15 serves as a control line for symbolic information, while the connection of the same segment electrode 9 (9a to 9g) through the second conductor path 16 serves as a check control line for monitoring of the entire control path including contacts.

In accordance with an embodiment of the invention, as illustrated in FIGS. 1 and 2, segment electrodes 9 are contacted through segment electrodes 11 arranged outside a liquid crystal cell 5 of liquid crystal display 1, by providing a printed circuit board 17 whose conductive paths covering the surface and contacting the segment contact 11 is divided into two electrically separate conductor lines corresponding to the conductor paths 15 and 16. A laminar rubber intermediate connector 18 effects an electrical connection between the segment contacts 11 and the conductor lines of the printed board 17.

The characteristic of an electrically anisotropic resistor layer is such that it is electrically insulating in its planar direction and electrically conductive normal to its planar direction. Such an effect is also exhibited by the aforementioned electrical component called the laminar rubber intermediate connector 18. Such a laminar rubber intermediate connector 18 is composed of adjacently arranged elastomer layers wherein the layers are alternately conductive and insulating. According to one embodiment, the conductive layers or fibers are composed of graphite, a silver filling or the like, and are aligned perpendicular to the plane of the layer 18. The specific gravity of the conductive fibers or layers indicates the number of conductive layers, for example, per linear centimeter. If the conductive fibers possess a high density, it is possible to provide separate electrical connections very compactly. The electrical connections are produced by having external mechanical means MM compress the layer material between the surfaces to be conductively connected.

As illustrated in the drawings, the intermediate connector 18 makes it possible for the multiple, mutually insulating, contacting action of a segment contact 11 to divide the conductive connections into a control path 20 and a checking path 21, so that data applied through the control path 20 to the segment electrode 9 can be supplied directly to a monitor unit 19.

One may wish to think in terms of a "cross-section" of the control path for transferring control signals or the checking path for transferring check or test signals. Such a cross-section is effectively determined by the contact produced over a specific area by the number of conductive fibers at the specific area in the material of the intermediate connector 18 contacting the conductor leads or paths 15 or 16 as shown in the disclosed embodiment.

The invention and the arrangement illustrated in the disclosed embodiment are not limited to splitting of the contact into a control path and a checking path. With an extremely compact arrangement of conductor lines, they are also suited for a multiple conductive connection in intermediate connector zones so as to ensure a very high degree of protection in the transfer of data signals. The multiple available contacting conductor lines in contact transition zones provide increased reliability to satisfy, to a large extent, the stiff operating quality requirements of tested measuring devices.

The conductive transition zones through the intermediate laminated elastic connector 18 between the segment contact 11 of the liquid crystal display 1 and the conductor tracks or leads 15 and 16 are illustrated only very schematically in the drawing. The control unit 13 transmits symbol signals for the display of a number through the control lines 12 which are graphically combined in FIG. 1 in a collective control bus 22. The control unit 13 applies the signals to appropriate conductor leads 15 on the printed board 17 for input to the liquid crystal display 1. The control signal is taken directly from the liquid crystal display 1 as shown and applied as a check signal to the monitor circuit 19 through appropriate check control lines 23 that form a collective check bus 24. The second conductor lead 16 on the printed circuit board is connected to a check control line 23 and thus satisfies the purpose of the monitor check or test.

The monitor unit 19 compares the sensed check signal with the control signal coming from the electronic unit 13 through the diagramatically illustrated connecting line 25. In the event the comparison results in inequality of the two signals, the monitor unit causes the control unit to display some type of alarm indication such as the display "blank" or other disturbance signal that notifies the operator of an incorrect display.

The embodiment disclosed in the drawing represents a mutli-digit liquid crystal display with the n to x numbers. The symbol supply of any number is composed of segment electrodes 9a through 9g which forms a so-called seven segment display. All remaining numbers of the liquid crystal display 1 are arranged accordingly up to the decade x.

The method and means of the invention makes it possible to connect any liquid crystal cell of the conventional type to a monitoring and checking device. In addition to being able to notice optically perceptible faults caused by internal problems in a liquid crystal cell, the invention makes it possible to monitor and check the control paths including the contacts with very little effort. Above all, the invention makes possible detection of incorrect display behavior which is normally imperceptible to an observer. This is particularly true for error sources arising from contacts that disturb segment signals between the control unit and the display cell or are otherwise introduced into the display. In most cases, this would lead to an unnoticed, inaccurate digit indication.

By splitting the contacting of the segment electrodes, optimum efficiency with respect to forward and return flow of segment signals. Without substantial further effort or further load on the display components, the invention permits effective monitoring and check while fully maintaining the usual control quality.

According to another embodiment of the invention, the unit 19 is a redundant control unit which transmits redundant signals into the display unit 1 for multiple parallel control of control signals and increased reliability of the displayed data.

The layer 14 is well known and available commercially under the trademark "TECKNIT, Conductive Elastomeric Connectors in Electronics" from "Technical Wire Products, Inc., 129 Dermody Street, Cranford, N.J. 07016", presented at the 10th Annual Connector Symposium, Cherry Hill, N.J., Oct. 19 and 20, 1977.

While embodiments of the invention have been described in detail, it will be evident to those skilled in the art that the invention may be mbodied otherwise without departing from its spirit and scope.

What is claimed is:

1. A display arrangement, comprising:
   a passive data display including a plurality of sets of segments, each set of segments being arranged so that activation of selected segments in any one of the sets produces an image of a desired symbol,
   a plurality of contacts each connected to a segment of said display,
   a printed circuit board having a pair of separate conductor leads facing each of said contacts,
   laminated elastic connector means having a pair of faces and a plurality of conductors extending between the faces,
   said connector means being positioned between the contacts and said conductor leads on said printed circuit board, and
   means for applying operating signals to said segments through one of said leads, and
   means for sensing the operation of said segments through the other of said leads on said printed circuit board.

2. An arrangement for controlling and checking the operation of an essentially passive data display cell for the display of symbols through the activation of a number of separately controllable segments, characterized in:
   a plurality of segment contacts arranged outside a liquid crystal cell and connected to said segments,
   a printed board having a pair of electrically separate conductor leads, and
   connector means forming an electrical connection between each of said segment contacts outside said liquid crystal cell and both of said conductor leads on said printed board so as to divide the connection of each segment contact,
   said connector means including an intermediate laminated elastic connector having a plurality of mutually insulated conducting paths connecting the leads to the contacts.

3. An arrangement according to claim 2, further comprising a control unit for supplying control signals through the mutually insulated conducting paths to the segment contacts, a control bus for coupling one of said leads to said control unit so that data is applied to the segment electrodes through the control bus, a checking bus for coupling to the other of said leads, and a monitoring unit for sensing the potentials at the segment contacts and comparing it to the potential at the control unit.

4. An arrangement according to claim 3, wherein the connector means is an electrically anisotropic resistor layer formed of the laminated elastic, said elastic forming a layer, the mutually insulated conductive paths extending transversely to the layer and being a plurality greater than two at each contact to ensure splitting of contact with said segment electrodes and so that each segment electrode is connected to the control unit and monitoring unit.

5. An arrangement as in claim 2, further comprising: means for applying identical data signals to each of a pair of the electrically separate conductor leads of the printed circuit board.

6. An arrangement as in claim 2, further comprising: first circuit means for applying data signals to one of said pair of electrically separate conductor leads on the printed circuit board, and
check circuit means for sensing the data on the other of the pair of electrically separate conductor leads and comparing the data to the data from said first circuit means.

7. An arrangement according to claim 2, further comprising a control unit and a monitoring unit, and wherein the connector means is an electrically anisotropic resistor layer formed of the laminated elastic, said elastic forming a layer, the mutually insulated conductive paths extending transversely to the layer and being a plurality greater than two at each contact to ensure splitting of contact with said segment electrodes and so that each segment electrode is connected to the control unit and monitoring unit.

8. An arrangement according to claim 2, wherein said printed circuit board has a plurality of pairs of electrically separate conductor leads, and said connector means forms an electrical connection between each of said segment contacts and both of said conductor leads in each pair so as to divide the connection of each segment contact to each conductor lead.

9. An arrangement according to claim 8, wherein the connector means is an electrically anisotropic resistor layer formed of the laminated elastic, said elastic forming a layer, the mutually insulated conductive paths extending transversely to the layer and being a plurality greater than two at each segment contact to ensure splitting of contact with said segment electrodes.

10. An arrangement according to claim 8, further comprising a control unit for applying operating signals to said segments through one of the conductor leads in each pair and a monitoring unit for sensing the operation of said segments through the other of said leads in each pair.

11. A display arrangement comprising:
a passive display including a plurality of sets of segments, each set of segments being arranged so that activation of selected segments in any one of said sets produces an image of a desired symbol,
a plurality of contacts outside of said display each connected to one of said segments,
control-monitor means for forming a control path and a monitor path for each of the segments,
a printed circuit board in said control monitor means and having a plurality of conductor leads,
laminated elastic connector means in said control-monitor means and having a pair of surfaces and a plurality of conductors extending between the faces,
said control-monitor means being arranged with said laminated elastic connector means sandwiched between said printed circuit board and said plurality of contacts so that each contact faces a pair of said leads and said connector means connects each contact with a pair of said leads to form the control path with one lead and the monitor path with the other lead.

12. A display arrangement as in claim 11, wherein said contacts are mounted on said display.

* * * * *